(12) United States Patent
Torzewski et al.

(10) Patent No.: US 6,353,845 B1
(45) Date of Patent: Mar. 5, 2002

(54) COMPUTER SYSTEM, PROGRAM PRODUCT AND METHOD FOR TRACKING ASYNCHRONOUS I/O WITH TIMEOUT SUPPORT

(75) Inventors: Timothy J. Torzewski, Rochester; William J. Armstrong, Jr., Kasson, both of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/104,593

(22) Filed: Jun. 25, 1998

(51) Int. Cl.$^7$ .......................... G06F 13/10; G06F 13/26
(52) U.S. Cl. ........................................... 709/102; 710/6
(58) Field of Search ................................ 711/106, 169; 710/25, 52, 6; 709/104, 102; 395/700, 750

(56) References Cited

U.S. PATENT DOCUMENTS 5,247,655 A * 9/1993 Khan et al. ................. 711/106
5,410,700 A * 4/1995 Fecteau et al. ............. 395/700
5,535,418 A * 7/1996 Suzuki ........................ 710/25
5,548,787 A * 8/1996 Okamura et al. ............ 710/25
5,666,532 A * 9/1997 Saks et al. .................. 707/205
5,675,829 A * 10/1997 Oskouy et al. ............... 710/6
5,765,004 A * 6/1998 Foster et al. ................ 395/750
5,835,957 A * 11/1998 Lin ............................ 711/169
5,903,766 A * 5/1999 Walker et al. .............. 395/750
5,996,031 A * 11/1999 Lim et al. ................... 710/52

* cited by examiner

Primary Examiner—Mark H. Rinehart
Assistant Examiner—Marc D. Thompson
(74) Attorney, Agent, or Firm—Wood, Herron & Evans

(57) ABSTRACT

An apparatus, program product and method of handling tasks that are sleeping and waiting for the completion of I/O operations of other tasks comprises determining a second task which is to await the completion of the I/O operations of a first task, and putting the second task to sleep. A timer is created and associated with the second task. The timer expires when a predetermined wait interval is exceeded. When the timer expires, the sleeping second task is awoken so that a sleeping task is generally prevented from waiting indefinitely for the I/O operations of another task.

25 Claims, 4 Drawing Sheets

COMPUTER SYSTEM, PROGRAM PRODUCT AND METHOD FOR TRACKING ASYNCHRONOUS I/O WITH TIMEOUT SUPPORT

FIELD OF THE INVENTION

This invention is generally related to computers and computer software, and more specifically is related to improving the handling of sleeping tasks waiting on the I/O operations of other tasks.

BACKGROUND OF THE INVENTION

Computer technology continues to be improved for handling more useful and complex functions associated with specific applications. Despite the continual advances in the speed and power of computers, however, these applications of computer technology continue to demand even greater computing power. For this reason, an ever-present need exists for improving the performance of the computer software that controls how a computer operates.

Generally, the software that controls how the computer operates, in its most basic form, is referred to as the operating system of the computer. The operating system is essentially a set of software programs that manages the various hardware and software resources of the computer and handles the computer's interaction with users. For example, it is the operating system that creates the computer's prompts and screens on the monitor to interface with a user and that runs the computer's programs for the user. Furthermore, the operating system will allow a computer to interface with its hardware resources, such as a printer or a disk drive, or will allow a user to run other higher level software applications on the computer such as Microsoft's WINDOWS program. The operating system, therefore, must be able to complete a large number of different functions to ensure that the computer, including its accessible hardware and software resources, functions properly and at a sufficient speed for the user.

Within the operating system of a computer, the various internal functions which are handled are referred to as "tasks." These various tasks may be thought of, in the traditional sense, as jobs that the computer must do when it is properly running programs for a user. A related series of such tasks is referred to as a thread. For example, a task might involve updating the contents of a file or writing a file to a storage device, such as a disk drive. A thread, on the other hand, may consist of a series of such tasks including updating the contents of a file, and then, when the file is updated, writing the file to the disk.

Within an operating system, the tasks will generally be taking place simultaneously for efficient operation of the computer, that is, two or more different tasks or threads will be running at the same time. The various tasks will usually continue to completion unhindered and will then be repeated as necessary depending upon the applications being run on the computer by a user. In such a scenario, one task or thread would not interfere with or hinder another task or thread.

However, for certain software applications, it may be necessary for certain tasks to wait until other tasks have been completed. This is usually the case where tasks will need to access a hardware resource or device, such as a disk drive and will require other tasks to wait until such access has been competed. That is, certain related tasks or threads, once they have executed, may have to wait until another group of tasks or threads completes their interaction with a hardware device before they resume and/or repeat.

To that end, a particular software application will require a second group of tasks to wait until the hardware access of a first group of tasks is complete, and then the second group of tasks will be free to resume. Task access to a hardware resource by the operating system is generally referred to as an INPUT/OUTPUT operation or I/O operation. Not all tasks will require an I/O operation, and therefore many tasks will be completed unhindered by ongoing I/O operations by other tasks. However, as noted, a second group of tasks may require completion of all the I/O operations of a first group of tasks before the second group resumes. That is, the second group of tasks "waits" on the first group to complete its I/O operations.

To effect such waiting between tasks, the software of the computer will effectively block the progression of the second group of tasks until the I/O operations of the first group of tasks are initiated and completed. One technique for making the second task group wait is to use a software block object for the task group. The block object is a software object that is associated with waiting tasks and that will effectively prevent the second task group from proceeding until it is removed. The removal of the block object with respect to the waiting tasks is referred to as "unblocking". The waiting tasks are referred to as being "asleep". When the block object is unblocked, the sleeping tasks are "awakened" and will proceed to execute.

Putting tasks to sleep to await completion of the I/O operations of other tasks is a known method of controlling the overall operation of a computer software program when multi-tasks or multi-threads are utilized in the program. For example, within programs running on the IBM AS400 operating system, a software object referred to as the AsyncTracker will use block objects to control the start of tasks within a multi-task environment. With AsyncTracker, a task is put to sleep by blocking it with a block object. When the I/O operations are complete, the task is awaken by unblocking the block object. Problems will sometimes occur, however, when a task or thread is waiting for completion of an I/O operation, and completion of that I/O operation never occurs. The task may then remain asleep indefinitely, which is an undesirable condition. For example, such indefinite waiting may occur when the first task or thread is unreliable and does not initiate the I/O operations. The block objects will remain in place and the tasks will not awaken. This may cause problems within the program because the waiting tasks are not executed.

Therefore, a need exists to be able to address sleeping tasks and threads waiting for the completion of I/O operations related to an unreliable task or tasks. Specifically a need exists to awaken sleeping tasks and threads when the I/O operation they are waiting for is not in progress.

SUMMARY OF THE INVENTION

The invention addresses the above-referenced problems and other problems associated with the prior art of the computer system, program product, and method, which improves the handling of sleeping tasks which are waiting for completion of I/O operations of other tasks. More specifically, a second task, or a set of second tasks, which are to await the completion of the I/O operations of a first task, or of a set of first tasks, is determined and the second task(s) are put to sleep. A timer is then created and is associated with the second task(s). The timer expires when a predetermined wait interval is exceeded. When the timer expires, the sleeping second task(s) are awakened, regardless of the completion of the I/O operations of the first task(s). Thereby, sleeping task(s) are generally prevented from waiting indefinitely for the I/O operations of other task(s) which may be unreliable. More specifically, a block object is created and the second task(s) are put to sleep by blocking those task(s) with the block object. The block object is configured so that the second task(s) awaken when the block object is unblocked. The block object is associated with the timer, and when the timer expires, the block object is unblocked to thereby awaken the sleeping second task(s). In accordance with one aspect of the present invention, when a set of tasks is put to sleep to await a timer, one of the tasks may be awakened while other of the tasks remain sleep. The awoken tasks will then initiate and complete the necessary I/O operations and the remaining sleeping tasks will awaken when those I/O operations are complete.

In accordance with another aspect of the present invention, the timer is created when the last I/O operation of the task upon which the other tasks are waiting has not been commenced. Conversely, the created timer will then be cancelled should the last I/O operation of the waited upon task commence. Further, the sleeping second task(s) will be awakened when the I/O operations of the first task(s) are completed, independent of the timer expiration. Therefore, while the timer is created in accordance with the present invention to generally prevent indefinite waiting of a set of tasks upon the I/O operations of another task, upon completion of those I/O operations, the timer will generally have no effect and the sleeping tasks will be awoken and will proceed in the usual manner.

In accordance with another aspect of the present invention, the outstanding I/O operations of first task(s) to be completed are monitored. The commencement of the last I/O operation of the outstanding I/O operations is also monitored. By monitoring those two conditions, the completion of the first task(s) I/O operations is determined, and if all of the I/O operations are completed and the last I/O operation has commenced, then the sleeping task(s) are awoken. These features and other features of the invention are discussed in greater detail below in the Detailed Description of the Invention which makes reference to the drawings to illustrate one or more embodiments of the invention.

BRIEF DESCRIPTION OF THE FIGURES

The accompanying drawings, which are incorporated in and constitute a part of this specification, illustrate embodiments of the invention and, together with a general description of the invention given below, serve to explain the principles of the invention.

DETAILED DESCRIPTION

Overall Hardware and Software Environment

Figure 1:
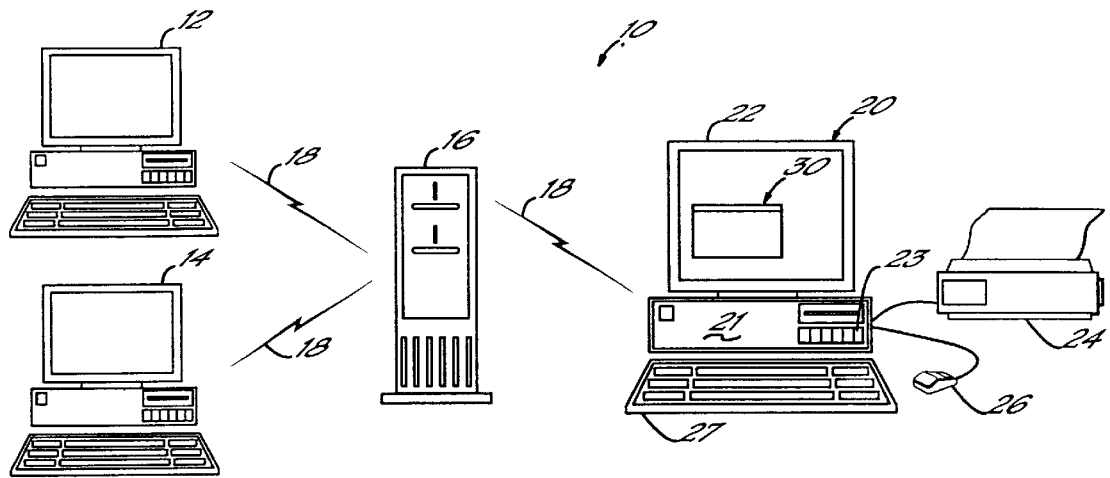
FIG. 1 is a schematic hardware diagram of a network environment consistent with the invention.

Turning to the drawings, wherein like numbers denote like parts throughout the several views, a networked computer system 10 consistent with the invention is illustrated in FIG. 1. Computer system 10 is a networked computer system and includes one or more remote or client computer systems 12, 14 and 20 (e.g., desktop or personal computers, workstations, etc.) which may be associated with a server system 16 (e.g. a PC-based server, a mini computer, a midrange computer, a mainframe computer, etc.) by logical connections or logical links (links) within network 18. The computer systems and the server will all be running various programs which have internal software tasks associated therewith. The links made with server system 16 by devices 12, 13, 20 are made through the network 18. Network 18 and the computer systems thereon may represent practically any type of networked interconnection, including but not limited to local-area networks (LANs), wide-area networks (WANs), wireless, and public networks (e.g., the Internet). Any number of computers and other user devices may be networked through network 18, e.g., through multiple servers.

Computer system 20, which may be similar to computer systems 12, 14, may include one or more central processor units (CPU), such as a microprocessor 21; a number of peripheral components such as a computer display 22 (e.g., a CRT, an LCD display or other display device); direct access storage devices 23 (DASD's) such as hard, floppy, and/or CD-ROM disk drives; a printer 24; and various input devices (e.g., a mouse 26 and keyboard 27), among others. Computer system 20 operates under the control of an operating system, and executes various computer software applications, programs, objects, modules, etc. Moreover, various applications, programs, objects, modules, etc. may also execute on one or more processors in server 16 or other computer systems 12, 14, e.g., in a distributed computing environment. For example, each of the devices 12, 14, 16, and 20 and respective link stations coupled together through network 18 will execute programs for communicating or "talking" with each other over the network.

Figure 2:
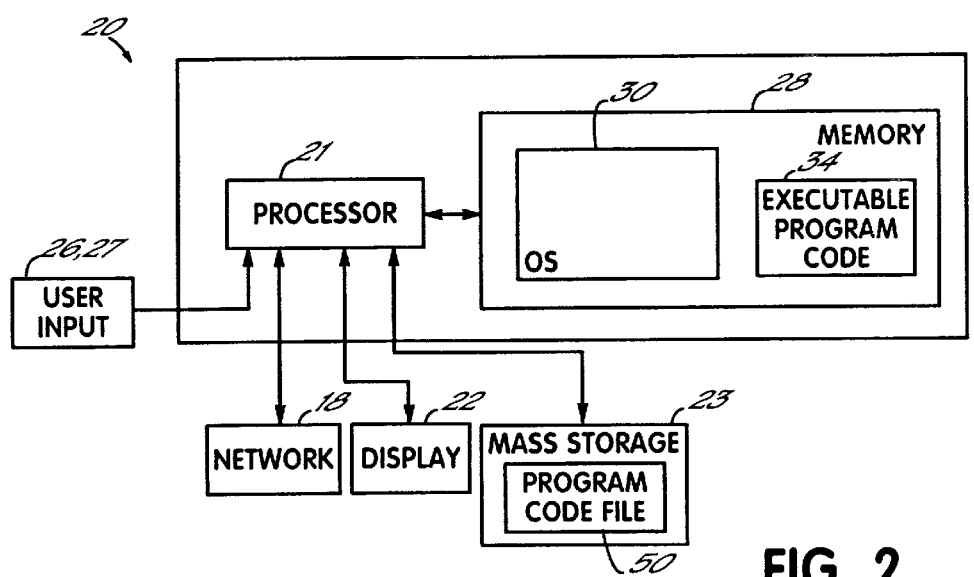
FIG. 2 is a block diagram of a networked device consistent with the invention.

In general, the software routines executed to implement the illustrated embodiments of the invention, whether implemented as part of an operating system or a specific application, program, object, module, communications protocol, or sequence of instructions will be referred to herein as "computer programs," or simply, programs. The computer programs typically comprise instructions that are resident at various times in various memory and storage devices in the computer, and that, when read and executed by one or more processors 21 in the devices or systems in networked computer system 10, cause those devices or systems to perform the steps necessary to execute steps or elements embodying the various aspects of the invention. The instructions executed as part of the computer programs may be thought of as tasks completed by the computer. Multiple related tasks together are considered threads. The tasks and threads progress in a logical format as the computer program runs. To that end, certain tasks or threads will wait on other tasks or threads before executing as discussed above. While the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include, but are not limited to recordable-type media such as volatile and non-volatile memory devices, floppy and other removable disks, hard disk drives, optical disks (e.g., CD-ROMS, DVD;s, et.) among others, and transmission-type media such as digital and analog communication links. Furthermore, the invention applies regardless of the type of signal-bearing media used to establish the links on the network 18. Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 2 illustrates one suitable software environment for the managing waiting tasks consistent with the invention. A processor 21 is illustrated as coupled to a memory 28 as well as to several inputs and outputs. Processor 21 may represent one or more processors and memory 28 may represent the random access memory (RAM) devices comprising main storage of a computer system 20, as well as other memory (e.g., cache memories, non-volatile or back-up memories, such as programmable or flash memories, and read-only memories, etc.) In addition, memory 28 may be considered to include memory storage physically located elsewhere in computer 20, e.g., any cache memory in processor 21, as well as any storage capacity used as a virtual memory, e.g., as stored on a mass storage device 23 or on another computer coupled to computer 20 via a network. For example, user input is received by processor 21, by mouse 26 and keyboard 27, among others. Additional information may be passed between computer system 20 and other computer systems or link stations in networked computer system 10 via the network 18. Additional information may be stored to and/or received from mass storage 23. Processor 21 also outputs display data to an output device such as display 22. It should be appreciated that computer system 20 includes suitable analog and digital interfaces between processor 21 and each of components 18, 22, 23, 26, 27 and 28, as is well known in the art.

An operating system 30 is illustrated as resident in memory 28, and is configured to execute program code on processor 21 (e.g., executable program code 34), as well as to retrieve program code such as program code file 50 from mass storage 23 and/or from network 18, among other operations. The computer 20, under control of operating system 30 executes various software applications, components, programs, objects, modules, etc. Furthermore, various such software applications, etc. may be executed on one or more processor in another computer coupled to computer 20 via a network in a distributed or client-server computing environment. The mass storage device may be a direct access storage device (DASD), such as a hard disk, for example. Furthermore, it should be appreciated that any of the operating system code 30, executable program code 34, and program code file 50 may, at different times, be resident in whole or in part in any of memory 28, mass storage 23, network 18, or within registers and/or caches in processor 21. The software of the operating system 30 and programs 34 and 50 will all have tasks and threads associated therewith which must be managed for proper execution.

It should be appreciated that other software environments may be utilized in the alternative.

Task Tracker

In one embodiment of the present invention, various waiting tasks are handled using a software mechanism which modifies an existing software mechanism for managing the tasks. Specifically, the software mechanism is referred to as Timed Tracker object and is a software object which builds upon and inherits from an existing mechanism referred to as Tracker object. In another embodiment of the invention, the Timed Tracker exists independent of a Tracker. The Tracker object is a mechanism which is linked with various tasks or threads which are waiting another task's or thread's I/O operations. For example, the IBM AS400 Operating System utilizes a tracker object referred to as AsyncTracker which relies upon a blocker or block object to effectively block and create a waiting or sleeping task or thread. Of course, other task tracking and scheduling mechanisms may be utilized to implement the present invention. When the I/O operations are completed for certain tasks and threads, the waiting or sleeping tasks or threads are awoken by unblocking the block object or blocker.

Figure 3A:
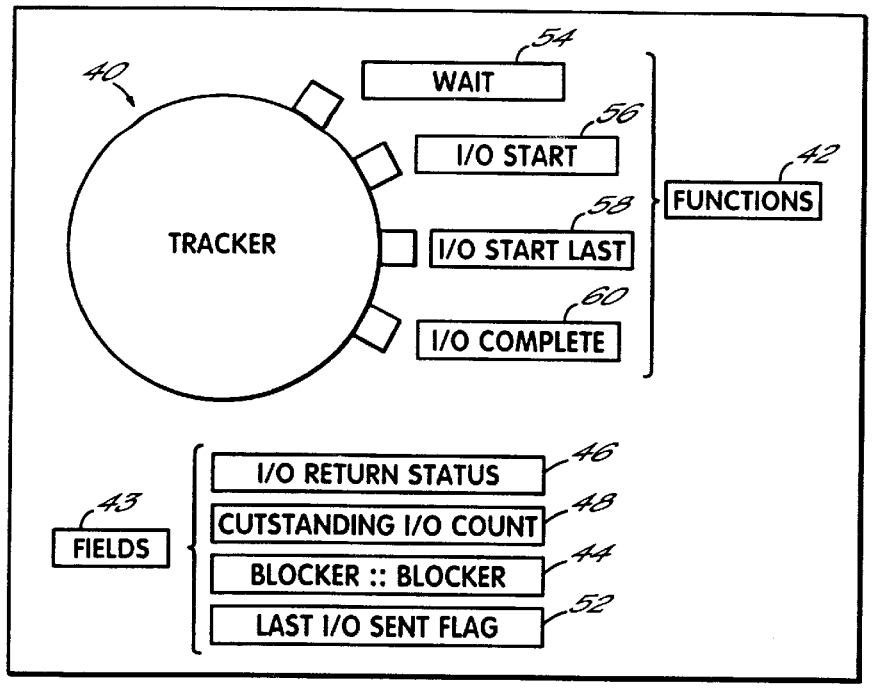
FIG. 3A is a schematic diagram of a software object for tracking the execution of a multi-track application.

Referring to FIG. 3A, a Tracker object 40 is illustrated consistent with the AsyncTracker of an IBM AS400 operating system. The Tracker object 40 has a series of associated functions 42 and fields 43. The Tracker object is created in accordance with well-known software principles. The fields 43 of Tracker 40 include a block object 44, which is referred to herein as blocker with respect to tracker 40. As discussed further herein below, a Timed Tracker object will utilize a block object or blocker which is referred to as a combined blocker 66. The blocker 44 is a software object which effectively prevents execution of a task or thread at the control of the tracker 40. Various waiting or sleeping links will be associated with tracker 40 and thus will be effectively blocked from execution by the blocker 44 of tracker 40. Preventing task execution and thus creating waiting task utilizing block objects or blockers is accomplished according to procedures known to a person of ordinary skill in the art. Fields 43 of the Tracker also include a data field I/O Return Status 46, a data field Outstanding I/O Count 48 and data field Last I/O Sent Flag 52.

The functions 42 of the tracker 40 include the function WAIT ( ). The WAIT function is called by the various waiting tasks associated with the tracker to determine whether they must continue to wait or whether the I/O operations have been completed and they may stop waiting and proceed (ie., the sleeping tasks awaken). The WAIT function 54 essentially determines that all the I/O operations have been completed, and if so, unblocks the blocker. When the blocker is unblocked, the waiting or sleeping tasks are awoken and will proceed.

Function I/O START ( ) 56 will essentially increment the Outstanding I/O Count field 48 to indicate that another I/O operation has been started. The outstanding I/O count field 48 is utilized by the WAIT function 54 to determine the number of outstanding I/O operation still need to be completed. The I/O START LAST ( ) function 58 determines when the last I/O operation of the pending tasks has started. The I/O START LAST function 58 utilizes the data field Last I/O Sent Flag 52. The Last I/O Sent Flag 52 will be set when the final I/O operation has commenced. The WAIT function 54 checks the data fields Outstanding I/O Count 48 and the Last I/O Sent Flag 52 to determine that all of the I/O operations have been completed and the last or final I/O operation has commenced and is also complete.

The function I/O COMPLETE ( ) will decrement the Outstanding I/O Count field whenever an I/O operation is completed. When the Outstanding I/O Count field 48 is equal to zero and the Last I/O Sent Flag 52 is set, the WAIT function 54 will know that the I/O's are complete, and thus will unblock the blocker 44 and allow the sleeping tasks to awaken and to proceed accordingly. As mentioned above, one example of the tracker object 40 is the AsyncTracker utilized within the AS400 Operating System commercially available from IBM. Greater details regarding the AsyncTracker, if needed, are available from IBM literature.

Timed Tracker Object

Herein, the term tasks will be used to refer to and will denote either tasks or threads for the purposes of illustration. Furthermore, the term tasks will refer to one or more tasks. The tasks which are waiting for the completion of I/O operations associated with other tasks are generally referred to as sleeping tasks. Throughout the Detailed Description, the term "sleeping" will be utilized to refer to waiting tasks. When the waiting tasks no longer have to wait, they are considered to be "awoken" and thus will proceed to execute. The block objects such as blocker 44 or a combined blocker 66 discussed hereinbelow, effectively blocks the sleeping tasks so that they remain asleep or in a waiting mode. When the block object is removed or "unblocked", the sleeping task will be awoken. That is, unblocking the block object awakens the sleeping task.

In accordance with one aspect of the present invention, a Timed Tracker object 62 or Timed Tracker is utilized to implement the invention. The Timed Tracker 62 object inherits various of the functions 42 and fields 43 of Tracker 40 as indicated by reference numeral 63. The Timed Tracker 62 modifies some of the inherited functions and also adds additional functions and fields. The inherited functions which are unchanged are indicated by reference numeral 64 whereas the inherited fields which are unchanged are indicated by reference numeral 65.

The Timed Tracker 62 creates a timer which enables those threads and tasks associated with the Timed Tracker 62 to wait a reasonable period of time for the initiation and completion of I/O operations associated with the pending tasks or threads. If no I/O operation is initiated within the specified time period, the timer associated with Timed Tracker 62 expires and the sleeping or blocked tasks are awoken. To that end, as discussed in greater detail hereinbelow, the Timed Tracker 62 utilizes a block object which is referred to as a combined blocker. The combined blocker 66 may be unblocked by either timer expiration or completion of I/O operations, and thus will prevent the indefinite waiting of tasks or threads on I/O operations which may never begin.

Figure 3B:
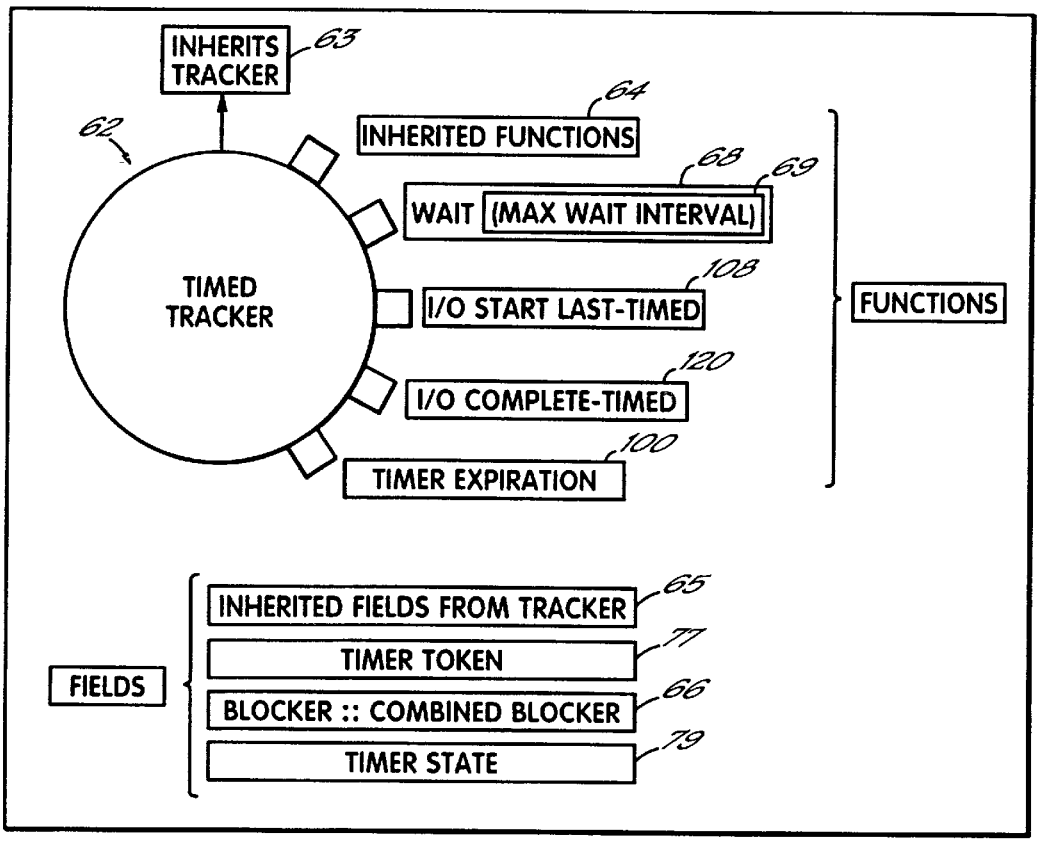
FIG. 3B is a schematic diagram of a software object for tracking the execution of a multi-ask application consistent with the present inventions.

Referring to FIG. 3B, the Timed Tracker 62 is associated with one or more sleeping tasks or threads which are to be awoken upon the completion of I/O operations of other tasks or threads or upon the expiration of a wait interval timer so that the sleeping tasks or threads do not wait indefinitely.

As mentioned, various sleeping tasks access Timed Tracker to determine when to awaken and continue. The Timed Tracker 62 created in accordance with the invention sets the waiting tasks to sleep on the modified block object referred to as combined blocker 66. The combined blocker 66 is similar in function to blocker 44 of the tracker 40, however, the combined blocker 66 will be unblocked either upon completion of the pending tasks I/O operations or upon expiration of the wait interval timer.

Figure 7:
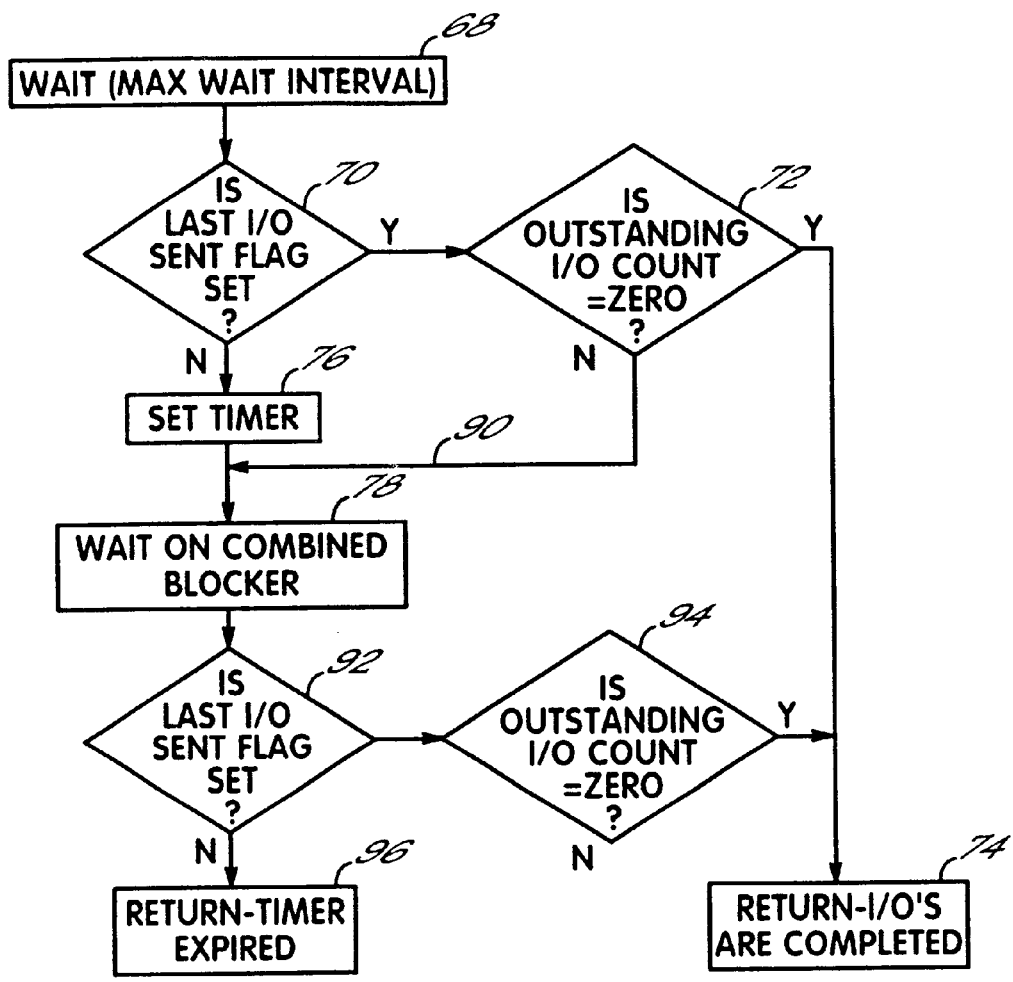
FIG. 7 is a software flowchart of another function of the software object of FIG. 3B consistent with the present invention.

To that end, the WAIT ( ) function 68 is an additional WAIT function of Timed Tracker 62 to be accessed by tasks which linked to the Timed Tracker 62. The WAIT( ) function 68 is in addition to the inherited WAIT ( ) function 54 that is inherited from Tracker 40. Therefore, tasks associated with Timed Tracker 62 may be put to sleep on a combined blocker 66 or an original blocker 44. WAIT ( ) function 68 utilizes an input value 69 defined as the maximum wait interval or Max Wait Interval. The Max Wait Interval 69 is essentially the timer interval or period for the timer to be created and set by the Timed Tracker 62. Referring to FIG. 7, a flow chart for the WAIT function 68 is indicated. When the WAIT function 68 is started, the Last I/O sent flag field 52 inherited from Tracker 40 is monitored to see whether that flag has been set, as indicated by decision block 70 of FIG. 7. If the Last I/O Sent Flag is set, which indicates that the last I/O operation of the pending tasks has commenced, then the function proceeds to decision block 72 to determine whether the last I/O has been completed, in which case all of the I/O operations are completed. To determine whether all of the I/O operations are completed, the WAIT function monitors the Outstanding I/O Count field 48 inherited from Tracker 40. The completion of all outstanding I/O operations will be indicated by an outstanding I/O count equal to zero. Then, if the Last I/O Sent Flag is set and the Outstanding I/O Count is equal to zero, then all the I/O's of the pending tasks are completed and the WAIT function 68 returns (flow chart block 74) to unblock any blockers and thus awaken the sleeping tasks.

Referring again to block 70, if the Last I/O Sent Flag is not set, a timer is created and set for expiring according to the Max Wait Interval input 69 as illustrated by block 76. When the timer is created, the Timer Token field 77 (shown on FIG. 3B) is utilized to provide a system software link between the Timed Tracker 62 and the timer. Therefore, the Timer Token 77 will allow the timer to be found in the system and will allow the timer to be cancelled when necessary by the Timed Tracker 62 when the timer is no longer needed, as discussed further hereinbelow. Furthermore, when the timer is created and set, the Timer's State field 79 of the Timed Tracker 62 will indicate the existence of the timer by indicating whether the timer has been started or not started. As discussed further hereinbelow, the Timer State field 79 will allow the Timed Tracker 62 to determine if a timer has been set, and if so, to cancel that timer under certain conditions.

The Timed Tracker 62 in accordance with the principles of the present invention will create a combined blocker 66 for certain tasks which combined blocker can be removed or unblocked either upon expiration of the timer or upon completion of the I/O operations of the current tasks. After the timer is created and set in the WAIT function 68, a wait begins for the sleeping tasks based upon the combined blocker 66 The combined blocker will be associated with one or more of the sleeping tasks linked the Time Tracker 66.

Other sleeping tasks linked to Timed Tracker 62 may be put to sleep on an original blocker 44 (that is, not a combined blocker). Those other tasks are then not awoken by expiration of the timer. Therefore, certain tasks wait on the combined blocker 66 as illustrated by flowchart block 78 in FIG. 7.

Referring to flowchart block 72, if the Last I/O Operation is commenced as indicated by the last I/O Sent Flag being set (block 70), but all the I/O operations have not been completed, as indicated by an Outstanding I/O Count which is not equal to zero, then the timer will not be set but rather the sleeping tasks will simply wait on the combined blocker as illustrated by decision path 90. In that way, the WAIT function 68 accounts for I/O operations wherein the final I/O has commenced, and thus the sleeping tasks only have to wait for completion of that last I/O. In such a case, a timer will not generally be necessary.

The WAIT function 68 continues to monitor the I/O operations as indicated by blocks 92, 94 and if the last I/O operation is commenced and has been completed, which is indicated by a yes decision with respect to blocks 92 and 94, then WAIT function Returns according to block 74 to indicate that all I/O are complete and the sleeping tasks are to be awaken. If not, the WAIT function will return upon the expiration of the timer as indicated by block 96.

Figure 8:
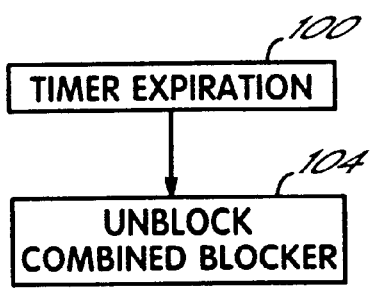
FIG. 8 is a software flowchart of another function of the software object of FIG. 3B consist with the present invention.

Referring to FIG. 8, function TIMER EXPIRATION ( ) 100 will unblock the combined blocker 66, as indicated by flowchart block 104. Therefore, when the timer expires during the waiting period of sleeping tasks, the tasks will be awoken by unblocking the combined blocker.

Referring again to FIG. 7, if the I/O operations are completed (as opposed to timer expiration), the combined blocker 66 and the original blocker 44 of the Timed Tracker 62 are unblocked to therefore awaken all sleeping tasks associated with the Timed Tracker. As illustrated in FIG. 8, however, only those tasks blocked by the combined blocker 66 will be awoken upon timer expiration. Other blocked tasks will remain asleep and must wait until the original blocker is unblocked.

Figure 4:
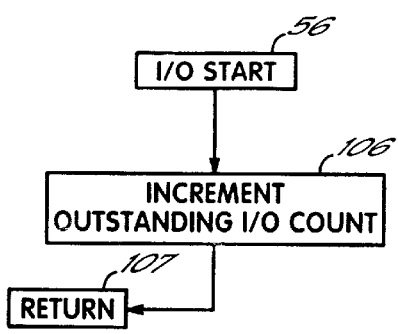
FIG. 4 is a software flowchart of one function of the software object of FIG. 3B consistent with the present invention.

The functions WAIT 68, I/O START LAST-TIMED, and I/O COMPLETE-TIMED operate on the inherited Field Outstanding I/O Count 48 which keeps track of I/O operations that still need to be completed. Referring to FIG. 4, the inherited function I/O START 56 is utilized by Timed Tracker 62 to increase the count for each I/O operation which is started. Function I/O START 56 increments outstanding I/O count 48 as illustrated by block 106 in FIG. 4. After the count is incremented, the function Returns (block 107). Outstanding I/O count 48 is then monitored to determine when all the I/O operations have been completed.

Figure 5:
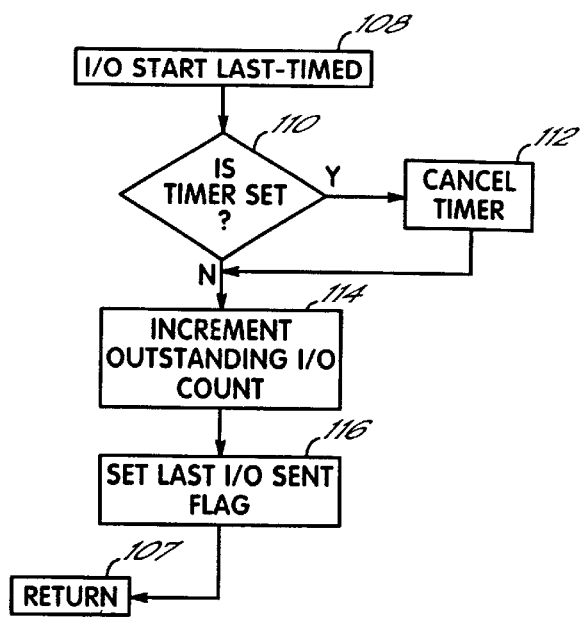
FIG. 5 is a software flowchart of another function of the software object of FIG. 3B consistent with the present invention.

As illustrated by the WAIT function 68, the commencement of the last I/O operation is also a necessary condition for awakening the sleeping tasks that are waiting for completion of the I/O operations. Referring to FIG. 5, the function I/O START LAST-TIMED 108 replaces the I/O START LAST function 50 which would normally be inherited from Tracker 40. In the I/O START-LAST-TIMED function 108, a check is made to see whether a timer is set as illustrated by block 110. Timer State field 79 will indicate whether the timer has been set and started. If a timer has been set, it is canceled (block 112) because the waiting task will now awaken upon the completion of the last I/O operation. If no timer has been set, then one will not be created, and the function will progress to increment Outstanding I/O Count to indicate that another I/O operation is to be completed. (Block 114). Finally, the Last I/O Sent Flag 52 is set. (Block 116). After the flag is set, the I/O Start Last-timed function 108 Returns according to block 117. Referring again to FIG. 7, when the Last I/O Sent Flag is set, then a timer will not be created as indicated by path 90 or will be canceled as shown in block 112 of FIG. 5. When the last I/O has been sent, the task will now awaken only upon the completion of the I/O, and a timer will not be necessary. In accordance with one aspect of the present invention, the timer will prevent indefinite waiting by sleeping tasks for the initiation of I/O operations by other tasks. However, if the last I/O operation has been initiated, it will generally be completed, thus awakening the tasks. Accordingly, the need for the timer is eliminated consistent with one aspect of the invention.

Figure 6:
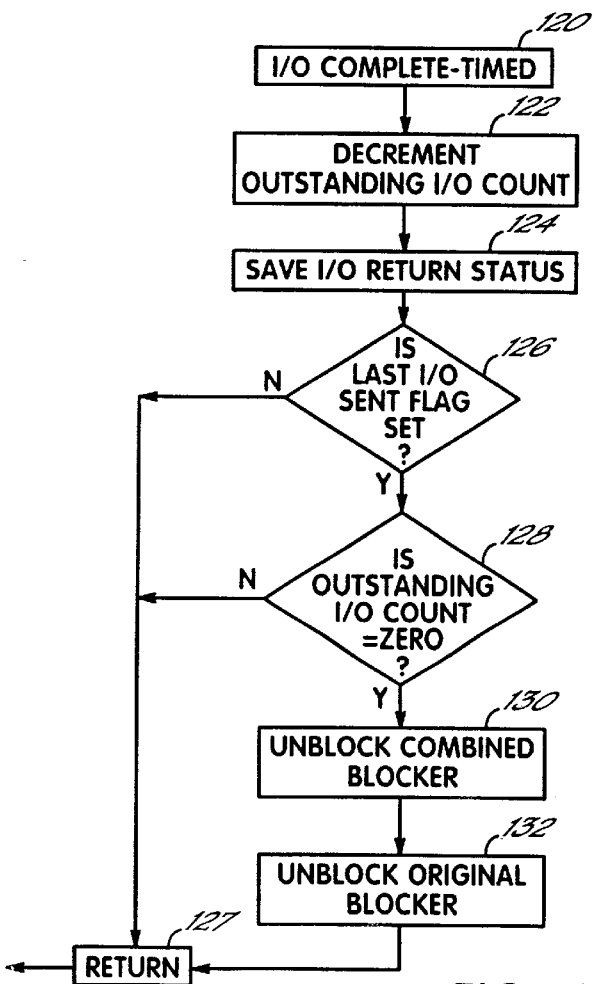
FIG. 6 is a software flowchart of another function of the software object of FIG. 3B consistent with the present invention.

Referring now to FIG. 6, each time an I/O operation is completed, the Outstanding I/O Count 48 is decremented and a determination is made on whether to unblock the combined blocker and the original blocker. To that end, the function I/O Complete-Timed 120 replaces the function I/O Complete 60 which would generally be inherited from tracker 40. As illustrated in FIG. 6, within the function I/O Complete-Timed 120, the Outstanding I/O Count is decremented, as shown by block 122. The I/O Return Status 46 is then saved to provide an indication on whether the I/O operation was properly completed or whether it failed. The I/O Return Status field 46 of Tracker 40 will then allow subsequent applications to address any I/O failures. The Tracker 40 or Timed Tracker 60 will keep track of the status of the completed I/O's for handling such failures as indicated by block 124.

Once an I/O has been completed, a determination is made by the I/O Complete-Timed function 120 regarding whether the I/O that was just completed is the final I/O operation upon which awaiting tasks are sleeping. To that end, as illustrated in block 126, the Last I/O Sent Flag is monitored to determined if the I/O operation just completed is the final I/O operation. If it is not, the function Returns. (Block 127). However, if it is the final I/O, then the function I/O Complete-Timed 120 will determine if that final I/O has been completed, as indicated by block 128. If the final I/O is completed, Outstanding I/O Count 48 will equal zero. Upon completion of all the I/O's, all the blockers on which the tasks are sleeping are to be unblocked, including the combined blocker 66 and any original blockers 44. To that end, upon completion of the last I/O, as indicated by a "YES" decision with respect to block 128, the combined blocker 66 is unblocked as shown by software block 130 and any original blocker is unblocked, as shown by flowchart block 132 in the flowchart of FIG. 6. As mentioned above, it is necessary to unblock both the combined blocker and the original blocker when the last I/O operation has been completed. However, if the last I/O operation is not commenced, which will be indicated by the Last I/O Sent Flag 52 not being set, the timer is relied upon, and upon expiration of the timer as indicated by function 100, the combined blocker will be unblocked. However, the original blockers for the remaining tasks will still be in place and those tasks will remain asleep.

EXAMPLE

An example illustrating the use of the Timed Tracker object 62, in accordance with the principles of the invention, is helpful in illustrating those principles and the advantages offered by the invention. For example, a program may exist which includes a large number of tasks which update a data file. For example, thousands of such tasks could occur each second when updating a file. To provide an indication to the system that the file updates have been completed, the file must then be written to a direct access storage device or DASD, such as a hard disk drive. However, writing to the disk each time that an update is made is too expensive. That is, having an I/O operation for the disk associated with each of the thousands of updates would create an extremely slow application.

Accordingly, an application which frequently updates a file and which must indicate such updates by writing the file to a hard disk, will utilize a scheme wherein the I/O operation, such as the DISKWRITE, occurs only after so many of the update tasks have occurred. For example, the program may perform the DISKWRITE I/O operation after fifty update tasks have been completed. The fiftieth ($50^{th}$) update task will then initiate the I/O operation, and then all fifty update tasks will go to sleep and wait until completion of the I/O operation before they proceed. That is, all fifty tasks are put to sleep on a block object to await completion of the I/O operation associated with the fiftieth task. With respect to Tracker 40, during the first forty-nine update tasks, the Outstanding I/O Count 48 will be equal to zero and the Last I/O Sent Flag 52 will not be set. At fifty tasks, the I/O operations will be initiated and the outstanding I/O count 48 will be equal to one for the I/O operation associated with the fiftieth update. Tasks one to fifty (1–50) will then go to sleep on a blocker 44 associated with Tracker 40. Upon completion of the last I/O operation, which in this case is only a single I/O operation, the blocker 44 will be unblocked and the tasks will awaken. In such a case, the Last I/O Sent Flag 52 will be set and the outstanding I/O count 48 will be equal to zero. As long as fifty tasks occur, and the fiftieth task will trigger the I/O operation, the file update program of the example will proceed and will be properly handled by a traditional Tracker 40.

However, the fiftieth task may not be completed, and thus, the I/O operation may never be commenced. For example, only forty tasks might occur and the fiftieth task will never be reached in order to initiate an I/O operation to write to a disk. Any number of conditions may occur which would prevent the fiftieth task from initiating an I/O operation. When only forty tasks occur and the I/O operation is set to start on the fiftieth task, the I/O operation will never be commenced. Accordingly, the forty update tasks, which have occurred and are sleeping, will wait indefinitely for the fiftieth task and initiation of a disk I/O which may never occur. Utilizing the Timed Tracker object 62 of the invention, the problem with tasks which are indefinitely asleep is solved by linking the first update task to Timed Tracker 62. The first task is then put to sleep on the combined blocker 66 of the Timed Tracker 62 and a timer is set according to the Maximum Wait Interval 69. When the timer expires, the combined blocker 66 is unblocked and the first task initiates an I/O operation to write all forty updates, or however many updates occur, to the disk. The timer length, as indicated by the Maximum Wait Interval 69, is set according to a value that is reasonable for allowing any of the remaining thirty-nine or more updates to occur. For example, if forty or more update tasks are completed in a quarter of a second, the timer associated with the first sleeping task may be set for one-half of a second. That is, the Maximum Wait Interval 69 will equal one-half a second. Of course, the length of the timer will be application dependent, as will be understood by a person of ordinary skill in the art.

When the timer expires, the first task awakens and initiates an I/O operation such as a DISKWRITE to write all forty or more updates to the disk. The first task is put to sleep on the combined blocker 66 of the timed tracker 62 while the remaining tasks two-forty (2–40) or more are put to sleep on an original blocker 44 of the Time Tracker 62. Accordingly, upon expiration of the timer, only the first task will awaken. The other remaining tasks will remain asleep. When the timer expires, the combined blocker is unblocked and the first task awakens to initiate an I/O operation. Upon completion of that I/O operation, the remaining tasks will all awaken. Therefore, all tasks (forty or more) will be awakened and will not be indefinitely asleep as discussed hereinabove with respect to the example using the original tracker.

Herein, certain tasks are referred to as first tasks and utilize I/O operations, while other tasks are referred to as second tasks and are generally asleep to wait upon the completion of the I/O operations of the first tasks. It should be understood that the nomenclature of "first" tasks and "second" tasks is for illustrative purposes and to define the invention, and does not indicate that the tasks are or are not related to each other in various ways. For example, as discussed above, certain tasks of a related group of tasks may be waiting upon the I/O operations of another specific task(s) of that group. In accordance with the invention, the specific task(s) is(are) designated as first task(s) and another sleeping task or tasks is designated as a second task and will be associated with the timer. Both the first and second tasks designated are still members of the same related group of tasks. Of course, they do not have to be related and any sleeping task (second task) could be waiting on another task (first task) and the second task would benefit from the invention so as not to be indefinitely waiting on the I/O operations of the first task.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method of handling tasks that are sleeping and waiting for the completion of I/O operations of other tasks, the method comprising:

determining a second task which is to await the completion of the I/O operations of a first task;

putting the second task to sleep;

creating a timer associated with the second task, the timer expiring when a predetermined wait interval is exceeded;

awakening the sleeping second task when the timer expires;

whereby a sleeping task is generally prevented from waiting indefinitely for the I/O operations of another task.

2. The method of claim 1 further comprising;

putting said second task to sleep by blocking the second task with a block object, the block object being configured such that the second task awakens when the block object is unblocked; and unblocking the block object of the second task when the timer expires to thereby awaken the sleeping second task.

3. The method of claim 1 further comprising:

determining a plurality of second tasks which are to await completion of the I/O operations of a first task, and putting those second tasks to sleep;

creating a timer associated with at least one of the second tasks;

awakening said at least one of the second tasks when the timer expires.

4. The method of claim 3 further comprising leaving at least one of the second tasks asleep even when the timer expires.

5. The method of claim 3 wherein said first task and said second tasks are from a set of related tasks.

6. The method of claim 1 further comprising the step of cancelling the created timer when a last I/O operation of the first task commences.

7. The method of claim 1 wherein said timer creation step is done when a last I/O operation of the task has not been commenced.

8. The method of claim 2 further comprising unblocking the block object when the I/O operations of the first task are completed to awaken the second task independent of the timer expiration.

9. The method of claim 3 further comprising:

leaving at least one remaining second task asleep even when the timer expires; and awakening the at least one remaining second task when the I/O operations are completed.

10. The method of claim 1 further comprising:

monitoring the number of outstanding I/O operations of a first task to be completed;

monitoring when a last I/O operation was commenced; and determining the completion of the first task I/O operations with said monitored outstanding I/O operations and said monitored last I/O operation.

11. An apparatus, comprising:

a memory;

a program resident in memory which includes a plurality of tasks, at least one of the tasks including an I/O operation;

a second program resident in the memory and configured to determine a second task which is awaiting completion of an I/O operation of a first task and to put the second task to sleep, the second program further configured to create a timer associated with the second task which expires when a predetermined wait interval is exceeded and to awaken the sleeping second task when the timer expires.

12. The apparatus of claim 11, wherein the second program is further configured to put the second task to sleep by blocking the second task with a block object and to unblock the block object of the second task when the timer expires to thereby awaken the sleeping second task.

13. The apparatus of claim 11, wherein the second program is further configured to determine a plurality of second tasks which are to await completion of the I/O operations of a first task and to put those second tasks and is further configured to create a timer associated with at least one of the second tasks and to awaken the at least one of the second tasks when the timer expires.

14. The apparatus of claim 13, wherein the second program is further configured to leave at least one of the second tasks asleep even when the timer expires.

15. The apparatus of claim 11, wherein the second program is further configured to cancel the created timer when a last I/O operation of the first task commences.

16. The apparatus of claim 11, the second program is further configured to create the timer when the when a last I/O operation of the task has not been commenced.

17. The apparatus of claim 12, wherein the second program is further configured to unblock the block object when the I/O operations of the first task are completed to thereby awaken the second task independent of the timer expiration.

18. The apparatus of claim 13 wherein the second program is further configured to leave at least one remaining second task asleep even when the timer expires and to awaken the at least one remaining second task when the I/O operations are completed.

19. The apparatus of claim 11, wherein the second program is further configured to monitor the number of outstanding I/O operations of a first task to be completed, to monitor when a last I/O operation was commenced, and to determine the completion of the first task I/O operations with said monitored outstanding I/O operations and said monitored last I/O operation.

20. A program product for use in handling tasks that are sleeping and waiting for the completion of I/O operations of other tasks, the program product comprising:

a program configured to determine a second task which is to await the completion of the I/O operations of a first task and to put the second task to sleep and further configured to create a timer associated with the second task which expires when a predetermined wait interval is exceeded and to awaken the sleeping second task when the timer expires;

a signal bearing media bearing the second program.

21. The program product of claim 20 wherein the signal bearing media is transmission type media.

22. The program product of claim 20 wherein the signal bearing media is recordable media.

23. The program product of claim 20 wherein the program is further configured to put the second task to sleep by blocking the second task with a block object and to unblock the block object of the second task when the timer expires to thereby awaken the sleeping second task.

24. The program product of claim 20 wherein the program is further configured to determine a plurality of second tasks which are to await completion of the I/O operations of a first task and to put those second tasks to sleep, and is further configured to create a timer associated with at least one of the second tasks and to awaken the at least one of the second tasks when the timer expires.

25. The program product of claim 24 wherein the program is further configured to leave at least one remaining second task asleep even when the timer expires and to awaken the at least one remaining second task when the I/O operations are completed.

* * * * *